US008949598B2

(12) United States Patent
Chhabra et al.

(10) Patent No.: US 8,949,598 B2
(45) Date of Patent: *Feb. 3, 2015

(54) METHOD AND APPARATUS FOR SECURED EMBEDDED DEVICE COMMUNICATION

(75) Inventors: Jasmeet Chhabra, Hillsboro, OR (US); Ranjit Narjala, Portland, OR (US); Amol Kulkarni, Hillsboro, OR (US); Michael Berger, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,643

(22) Filed: Dec. 22, 2011

(65) Prior Publication Data

US 2012/0272057 A1 Oct. 25, 2012

Related U.S. Application Data

(63) Continuation of application No. 12/059,354, filed on Mar. 31, 2008, now Pat. No. 8,091,123.

(51) Int. Cl.
*H04L 29/04* (2006.01)
*H04L 9/32* (2006.01)
*H04L 29/06* (2006.01)

(52) U.S. Cl.
CPC .............. *H04L 9/321* (2013.01); *H04L 9/3215* (2013.01); *H04L 63/0823* (2013.01); *H04L 9/3265* (2013.01); *H04L 2209/80* (2013.01)
USPC ............... 713/156; 713/150; 713/155; 726/5; 726/6; 726/10

(58) Field of Classification Search
CPC ..... H04L 9/3215; H04L 9/321; H04L 9/3265; H04L 63/0823
USPC ...................... 713/150, 155, 156; 726/5, 6, 10
See application file for complete search history.

(56) References Cited

U.S. PATENT DOCUMENTS

| 6,411,598 | B1 * | 6/2002 | McGlade ........................ 370/217 |
| 6,418,117 | B1 * | 7/2002 | Shah et al. ..................... 370/225 |
| 7,299,354 | B2 * | 11/2007 | Khanna et al. ................. 713/165 |
| 8,671,444 | B2 * | 3/2014 | Kulkarni et al. .................. 726/9 |
| 2002/0162019 | A1 * | 10/2002 | Berry et al. .................... 713/201 |
| 2003/0233531 | A1 * | 12/2003 | Lin ................................ 712/207 |
| 2006/0236105 | A1 * | 10/2006 | Brok et al. ..................... 713/169 |
| 2008/0077534 | A1 * | 3/2008 | Son ................................. 705/76 |

(Continued)

OTHER PUBLICATIONS

Network Working Group; Request for Comments: 4253; Jan. 2006.*

(Continued)

*Primary Examiner* — Lingland Edwards
(74) *Attorney, Agent, or Firm* — Blakely, Sokoloff, Taylor & Zafman LLP

(57) ABSTRACT

In a computing device that includes a host operating system and a management engine separate from the host operating system, if the primary operating system is not operating, a management engine may obtain from a credential server via a first network connection logon information for a secured network and the management engine connects to the secure network through a secured connection using the logon information. If the operating system is operating the operating system provides the logon information to the management engine. Certificate verification may be performed by a remote server on behalf of the management engine. Other embodiments are disclosed and claimed.

21 Claims, 4 Drawing Sheets

(56) References Cited

U.S. PATENT DOCUMENTS

| | | |
|---|---|---|
| 2008/0163373 A1* | 7/2008 | Maynard .................. 726/25 |
| 2009/0100242 A1* | 4/2009 | Lin et al. .................. 711/165 |
| 2009/0217048 A1* | 8/2009 | Smith .................. 713/176 |

OTHER PUBLICATIONS

Intelligent Platform Management; Interface Specification; Second Generation v2.0 Document Revision 1.0 Feb. 12, 2004.*

Office Action from U.S. Appl. No. 12/059,354 mailed Mar. 30, 2011, 31 pages.

Chen, Camille, et al., "Next-Generation PC Platform Built on Intel Centrino Mobile Technology New Usage Models", *Intel Corp*, vol. 9/Issue 01, ISSN 1535-864X, Feb. 17, 2005, 14 pages.

Housley, R., et al., RFC2459, "Internet X.509 Public Key Infrastructure Certificate and CRL Profile", Jan. 1999, 115 pages.

\* cited by examiner

METHOD AND APPARATUS FOR SECURED EMBEDDED DEVICE COMMUNICATION

This application is a continuation of, and claims the benefit of priority of, U.S. application Ser. No. 12/059,354, filed Mar. 31, 2008, now U.S. Pat. No. 8,091,123.

FIELD OF THE INVENTION

The present invention relates to embedded systems communication. More particularly the present invention relates to a method and apparatus for secured embedded device communication.

BACKGROUND OF THE INVENTION

Most active management technology (AMT) usage devices (which may be included in for example a "notebook" or laptop computer) depend on network connectivity. If an AMT device does not have a usable Internet connection, then the notebook computer cannot be effectively managed by an information technology (IT) administrator or a manageability service provider (MSP). If the host operating system (OS) is running, the manageability engine or management engine (ME, such as, for example, Intel Management Engine™) can use the host network stack to access the network; if not (e.g., the notebook computer is in power state S3, S4 or S5, or the host OS is corrupted), the network stack of the ME itself can be used to establish a connection. If the notebook computer is connected to a corporate network or other networks like home networks, the host network stack or network stack of the ME can be used, depending on the state of the host OS. This is also applicable when the notebook is located for example at home.

A "hotspot" generally refers to a venue or area that offers access (usually wireless access) to a publicly accessible network, typically either local area network (LAN) or wireless local area network (WLAN), typically free or commercial (e.g., requiring payment). Other types of hotspots are known. A commercial hotspot may require an account to be set up with the provider. The user may need to log in to the hotspot with pre-established credentials in order to gain full Internet connectivity.

If the host OS is running and there are no networking problems, the notebook computer may be reachable for manageability purposes by performing hotspot login on the host OS, typically requiring user intervention.

However, if the host OS is not running, the ME may be unable to interact with the user, since it cannot display messages or ask for run-time input (such as credentials from the user). It must therefore be able to connect to the hotspot network without any user interaction.

Furthermore, embedded devices with communication stacks (such as for example Intel AMT™, Intel ME™) need to communicate over secure protocols, such as, for example, hypertext transfer protocol over secure socket later (HTTPS), transport layer security (TLS) or other cryptographic protocols, for many functions. These protocols require the devices to store a large set of root certificates to validate the server certificate presented. However, embedded devices typically do not have enough storage capacity and it is difficult (and sometimes impossible) for them to store all the root certificates for certification authorities (CA) generally stored in a typical browser. This severely limits the servers such devices can securely communicate with because of the inability to verify the certificate chains in absence of root certificates. In addition, even these root certificates can expire and may have to be changed, which is hard to accomplish on an embedded device.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings (like components are denoted by like reference numerals) in which:

DETAILED DESCRIPTION OF EMBODIMENTS

In the following detailed description, specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure embodiments of the present invention.

Manageability is heralded as an important vector for mobile devices. Original equipment manufacturers (OEM) desire parity in manageability across different network connections due to a large number of mobile workers using wireless connections. According to embodiments of the present invention, parity may be obtained by allowing an AMT client to connect to hotspots or other public or private networks when the host OS is not running, is not functional or is in a sleep state without requiring user interaction.

According to embodiments of the present invention the ability for an AMT device to connect to hotspot networks or other networks in the absence of the host OS and user interaction may be achieved. The credentials that may be required for authenticating to the LAN or WLAN hotspot may be provided to the embedded device via an out-of-band (OOB) channel by an external server.

Figure 1A:
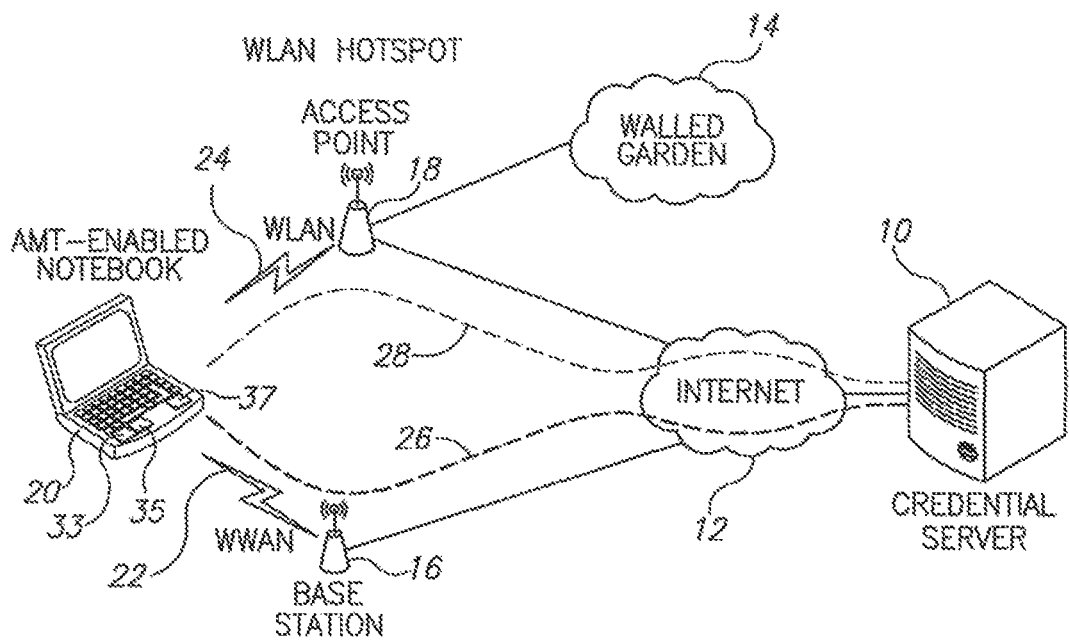
FIG. 1A illustrates an AMT enabled notebook computer and communication links to a credential server, according to embodiments of the present invention.

Reference is now made to FIG. 1A illustrating the process of obtaining logon information out-of-band by an AMT device, according to embodiments of the present invention.

When an AMT device of a portable computing device such as a notebook computer 20 (with embedded device 33, and ME 35) has to authenticate to a publicly accessible network such as a WLAN public hotspot network 18, or other suitable network, and the host OS 37 is non-functional, the AMT enabled notebook computer 20 may need to obtain credentials (and perhaps other information about the network connection required for logon) from for example credential server 10. A credential server typically holds logon information of verified users. The AMT enabled notebook computer 20 may already have an existing Internet Protocol (IP) connection via for example a wireless wide area network (WWAN) base station 16, but if WWAN connection 22 is expensive (e.g., the user fees in monetary terms are too high) to transfer large amounts of data to the AMT enabled notebook computer 20 (such as, for example, patches), it may be desired to use the WLAN 24 connection instead. If a WWAN connection 22 is available, the AMT enabled notebook computer 20 may utilize the WWAN connection 22 to contact the credential server 10; the AMT enabled notebook computer 20 may then provide information through link 26 (through, for example, the Internet 12) about the surrounding WLAN networks. The credential server 10 may identifies the most applicable service set identifier (SSID) from this list, and sends this via the link 26 along with the credentials to use. The AMT enabled notebook computer 20 can then use this information to connect to the hotspot 18 (using WLAN connection 24), and then proceed with regular manageability tasks over this less-expensive, perhaps even free, link 28.

While, throughout the specification, an AMT enabled notebook computer is used as an example, other computing devices having wireless capability may be used with embodiments of the invention.

Obtaining logon credentials in the manner described above, or according to other embodiments of the present invention may be necessitated because the ME, being an embedded environment in notebook computer 20, may not have sufficient storage to maintain the entire list of WLAN profiles and credentials that are supported for a particular user account. Obtaining WLAN profiles and credentials only when needed circumvents the storage limitations that embedded devices face.

If a WWAN connection (or other connection such as, for example, WiMAX) is unavailable, the AMT enabled notebook computer could use another mechanism over the WLAN connection 24 (at hotspot 18) itself to obtain this information. For example, if the AMT enabled notebook computer 20 has already previously connected to the hotspot 18 network, the AMT enabled notebook computer may be confined to a server with closed set or exclusive set of information services provided for users such as, for example, walled garden 14 until it has authenticated itself with the right credentials. While in walled garden 14, the AMT enabled notebook computer may use a technique such as domain name service (DNS) query overloading to contact the credential server 10 and obtain the appropriate information. It can then supply these obtained credentials to the hotspot 18 and thereby log in.

A hotspot client requiring on-the-go (OTG) manageability may benefit from embodiments of the invention. The client might need to obtain credentials for a public hotspot logon when the host OS is not functional. This may allow AMT to log on using the ME's network stack when the host is not running (e.g., is down) and without requiring user interaction.

It may be assumed that in some embodiments that a user account for the hotspot network has already been setup, or can be dynamically setup by the credential server 10 and the credentials for the user account may be stored or provided by a credential server that may be accessible on the Internet. It may also be assumed that in this scenario an AMT enabled notebook computer may need to connect to a public WLAN hotspot. Similarly, connection to a public LAN hotspot may be implemented.

Figure 1B:
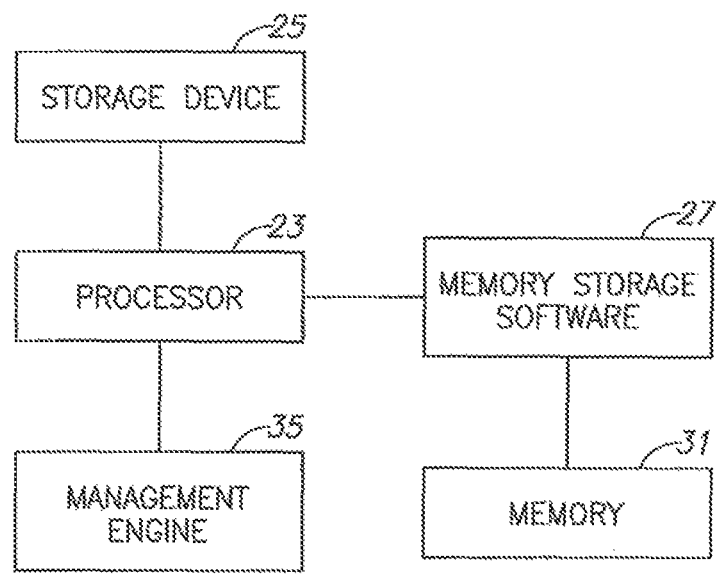
FIG. 1B illustrates a block diagram for a typical portable computing device according to embodiments of the present invention.

FIG. 1B illustrates a block diagram for a portable computing device, for example AMT enabled notebook computer 20 according to embodiments of the present invention. The AMT enabled notebook computer may include a processor 23, storage device, such as for example hard-disk 25 or other mass storage device, memory 31, a memory storing software 27 and a ME 35. The ME 35 may be implemented as software stored in memory executed by the processor.

In some embodiments, a computing device such as for example a portable wireless-capable computer may include a host operating system (e.g., controlling general functionality) and, for example an ME. The ME may be separate from and not share secure information with the main OS. If OS is not operating or is dormant, then the ME may obtain from for example a credential server via a first network connection, logon information for a secured network. The ME may then connect to the secure network through a connection such as a secured connection using the logon information. If the OS is operating the OS may provide the logon information to the ME.

Figure 2:
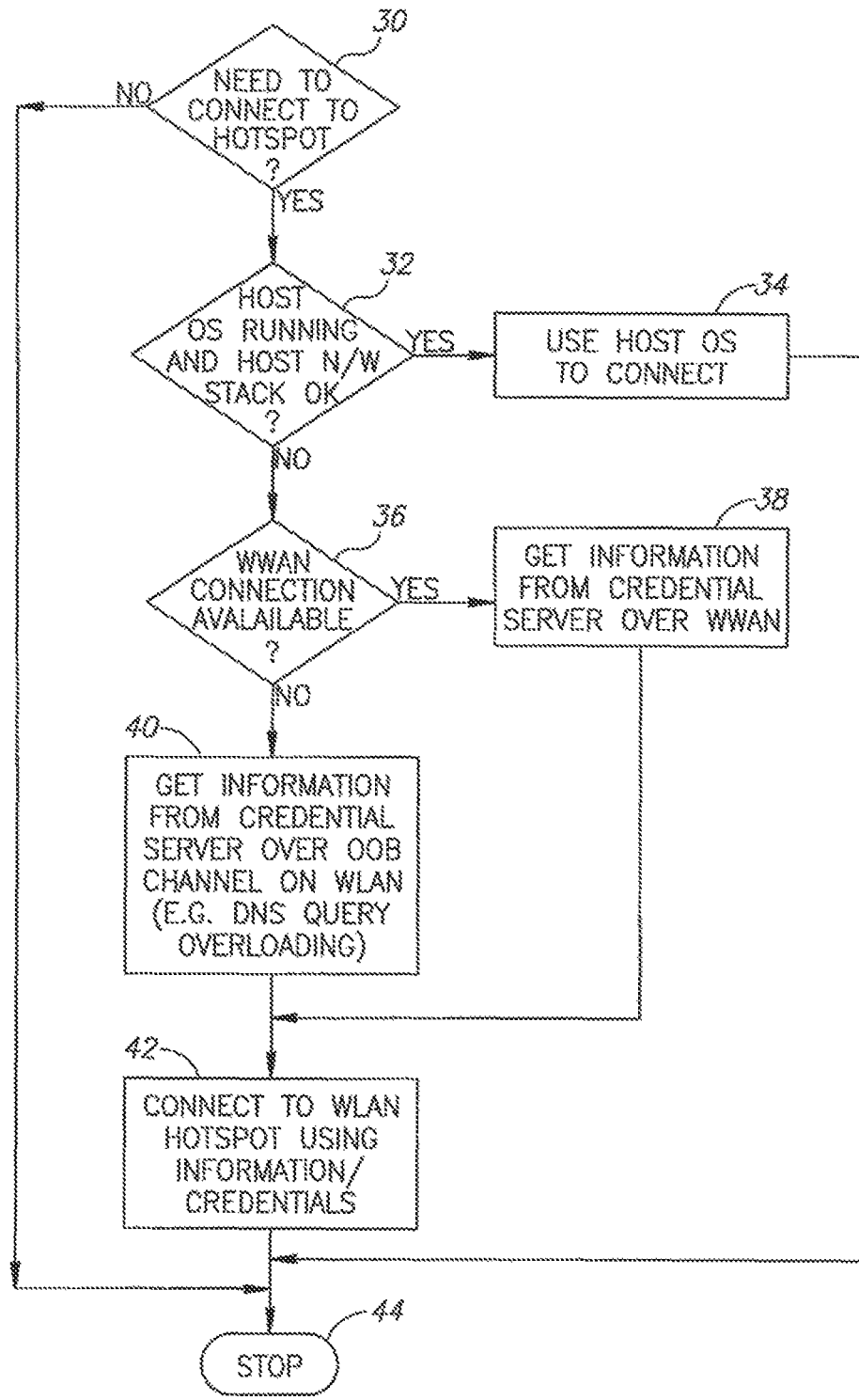
FIG. 2 is a flow chart of a method for automatically obtaining logon information and logging on to a hotspot, according to embodiments of the present invention.

FIG. 2 is a flow chart of a method for obtaining logon credentials and logging on to a network such as a hotspot for an embedded device, according to embodiments of the present invention.

In operation 30, it may be determined whether there is a need for connecting to a hotspot or other network. If not, the process may stop in operation 44. If there is a need, in operation 32 it may be determined whether the host OS is running or otherwise executing. If it is determined that the host OS is running, then in operation 34 the host OS may be used for verification and connection. If it is determined that the host OS is not running, then in operation 36 it may be determined whether a WWAN connection is available. If it is determined that WWAN connection is available, then in operation 38 information is obtained from the credential server and connecting to the WLAN hotspot (operation 42) may be performed. If it is determined that there is no WWAN connection available logon, then in operation 40 information is obtained over out-of-band link, and then a connection to the WLAN hotspot (operation 42) may be achieved.

In addition, according to embodiments of the present invention, a trusted remote server may be used to perform the validation and allow a computing device such as the AMT enabled notebook computer to communicate with a server whose certificate chain cannot be locally verified. For example, on Intel platforms, this may be useful in cases where the host OS is down, and the host cannot be used for storage or validation. This may be implemented for example in a ME based hotspot connectivity in Hx which may require a random hotspot provider certificate to be verified before logon can proceed, and in theft deterrence technology (TDT) server communication.

Figure 3:
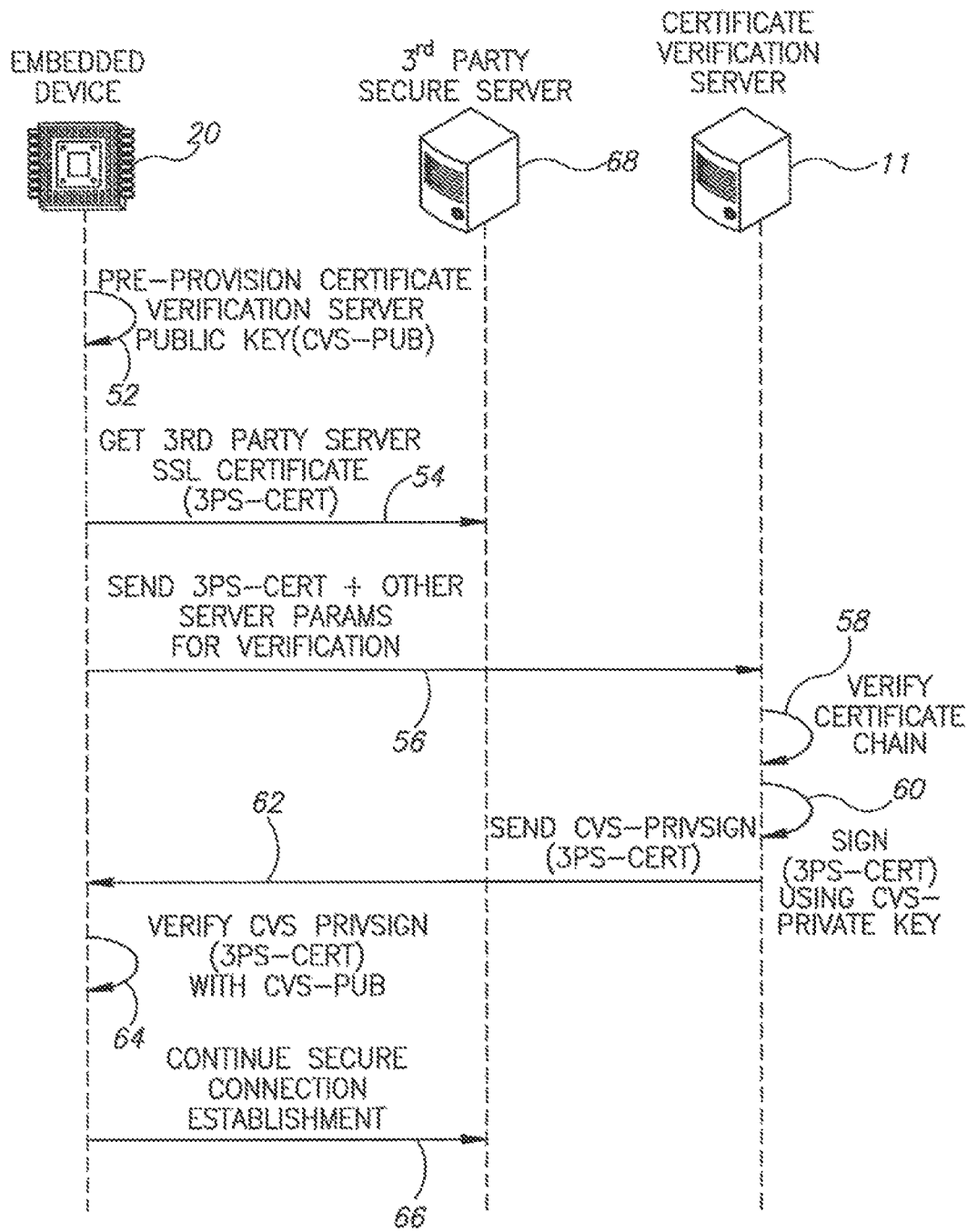
FIG. 3 is a flow chart of a method for remote certificate verification for an embedded device, according to embodiments of the present invention.

FIG. 3 illustrates implementation of verification by a remote server, according to embodiments of the present invention. A public key (CVS-pub) of a trusted certificate verification server (CVS) may be pre-provisioned (operation 52) into a computing device such as an AMT enabled notebook computer 20 (see. FIG. 1A). The public key may be provided over an out of band link (such as, for example, illustrated in FIG. 1A) or may be installed during manufacturing. The AMT enabled notebook computer 20 may connect to a third party server 68 and may obtain the server certificate (operation 54) from the third party server 68. The server certificate verification may be an asymmetric public key and other parameters signed with a chain of trusted servers. This certificate and the signature chain are typical of what a browser receives when it connects a secure server.

Due to limited storage an AMT enabled notebook computer may not store all certificate authority root certificates needed for verification of the third party server certificate. It may send this certificate (operation 56) to the trusted certificate verification server 11. A certificate verification server typically holds certificate verification information relating to servers. The certificate verification server 11 may verify the certificate chain (operation 58), and then may sign the certificate belonging to the third party server 68 with its own private key (e.g., CVS-priv, operation 60) and may send it back (operation 62) to the AMT enabled notebook computer 20. The AMT enabled notebook computer (typically the ME) may use the pre-provisioned CVS-pub to perform the verification of this signature 64. If the verification succeeds, the embedded engine may continue secure connection establishment (operation 66) with the third party server 68.

In some scenarios, the connection to the CVS may be bandwidth limited. This is the case, for example, if out-of-band short message service (SMS) connection over WWAN is used for connection initiation. In this case, it may be impractical to carry out the actions shown in FIG. 3. Instead, the AMT enabled notebook computer may only send the uniform resource locator (URL) information of the third party server. In such a scenario, the CVS may get the 3PS-certificate by directly connecting to the third party server and verifying it. After this it may merely sign the fingerprint (e.g., cryptographic hash) of the certificate and send it back to the embedded device. The AMT enabled notebook computer can then compute the fingerprint of the third party server certificate (for example SSL certificate) and verify that it matches the fingerprint received from the CVS.

Figure 4:
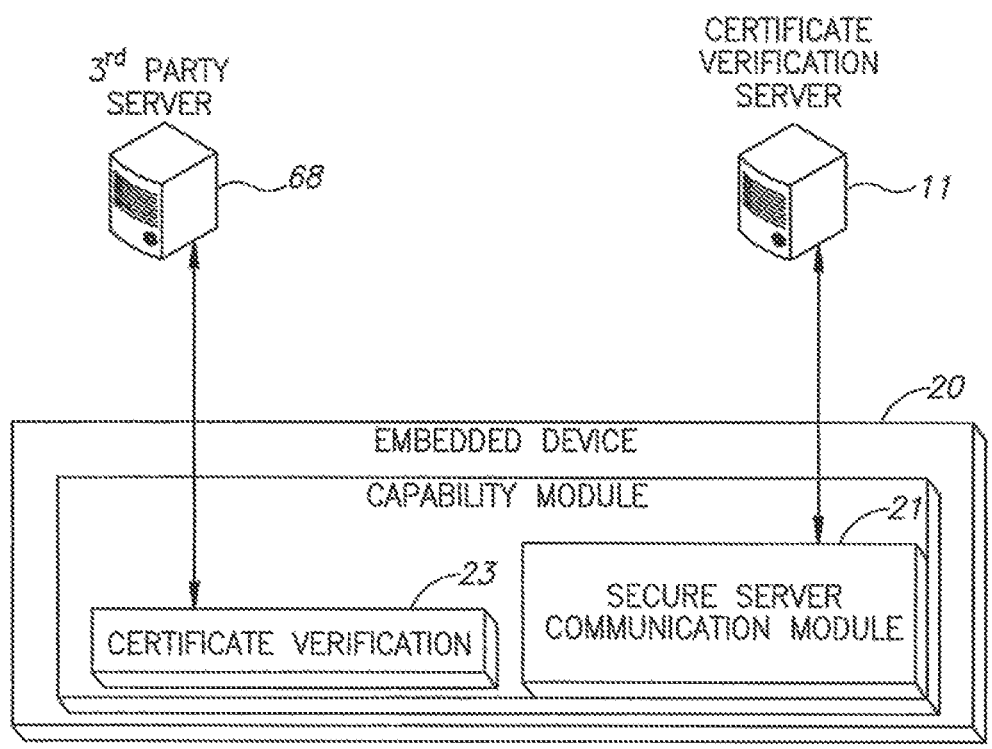
FIG. 4 illustrates an apparatus for remote certificate verification for an embedded device, according to embodiments of the present invention.

FIG. 4 illustrates an apparatus for remote certificate verification for an embedded device, according to embodiments of the present invention. The apparatus may include an embedded engine 20 with limited storage that needs to communicate securely with a server on a network (for example the Internet). Secure server communication module 21 is responsible for orchestrating the secure communication with the servers as needed under the appropriate secure communication protocol (such as, for example, TLS). Certificate verification module 23 is responsible for the verification of the CVS-priv signed certificate using the CVS-pub key. Third party server 68 is a server whose certificate the AMT enabled notebook computer needs to verify. Certificate verification server (CVS) 11 is a remote certificate verification server that verifies the trust chains for the certificates sent to it.

Embodiments of the invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

According to embodiments of the present invention a device such as an AMT enabled notebook computer such as, for example, Intel ME/AMT™ may communicate securely with a typical server on the Internet without requiring a large amount of space needed for locally storing certification authority (CA) root certificates.

According to embodiments of the present invention problems associated with pushing revocations and expirations for certificate authority root certificates to the AMT enabled notebook computer may be eliminated or reduced.

While the invention has been described with respect to a limited number of embodiments, it will be appreciated that many variations, modifications and other applications of the invention may be made. Embodiments of the present invention may include other apparatuses for performing the operations herein. The appended claims are intended to cover all such modifications and changes.

The invention claimed is:

1. A method comprising:
in a computing device comprising a host operating system and an embedded environment management engine separate from the host operating system, the embedded environment management engine including a memory device to store data for the management engine:
detecting by the management engine a secured network for which authentication credentials are required to access the secured network;
determining that the host operating system is not operating;
determining whether a second network connection different from the secured network upon is available;
obtaining the authentication credentials from a credential server via the second network upon determining that the second network is available;
obtaining the authentication credentials from the credential server via an out-of-band link upon determining that the second network is not available; and
the management engine connecting to the secured network using the obtained authentication credentials and communicate over the secured network from the management engine independently of the host operating system.

2. The method as claimed in claim 1, wherein the connecting to the secured network comprises connecting via a hotspot connection.

3. The method as claimed in claim 2, wherein the hotspot connection is selected from the group consisting of: local area network and wireless local area network.

4. The method as claimed in claim 1, wherein the connecting to the secure network includes using secure protocols.

5. The method of claim 1, wherein detecting the connection to the secured network further comprises determining that the management engine does not have a copy of the authentication credentials.

6. The method of claim 5, further comprising the management engine storing a copy of the authentication credentials for subsequent access to the secured network.

7. The method of claim 1, wherein the management engine comprises an embedded management environment.

8. A device comprising:
a processor executing:
a host operating system to operate user applications;
an embedded environment management engine separate from the host operating system, the embedded environment management engine including a memory device to store data for the management engine, the management engine to,
detect a secured network for which authentication credentials are required to access the secured network;
determine that the host operating system is not operating;
determine whether a second network connection different from the secured network upon is available;
obtain the authentication credentials from a credential server via the second network upon determining that the second network is available;
obtain the authentication credentials from the credential server via an out-of-band link upon determining that the second network is not available; and
the management engine to connect to the secured network using the obtained authentication credentials and communicate over the secured network from the management engine independently of the host operating system.

9. The device of claim 8, wherein the connecting to the secured network comprises connecting via a hotspot connection.

10. The device of claim 9, wherein the hotspot connection is selected from the group consisting of: local area network and wireless local area network.

11. The device of claim 8, wherein the connecting to the secure network includes using secure protocols.

12. The device of claim 8, wherein detecting the connection to the secured network further comprises determining that the management engine does not have a copy of the authentication credentials.

13. The device of claim 12, further comprising the management engine to store a copy of the authentication credentials for subsequent access to the secured network.

14. The device of claim 8, wherein the management engine comprises an embedded management environment.

15. An article of manufacture comprising a computer readable storage medium having instructions stored thereon, which when executed, cause a computing device having a host operating system and an embedded environment management engine separate from the host operating system, the embedded environment management engine including a memory device to store data for the management engine, to perform operations including:
  detecting by the management engine a secured network for which authentication credentials are required to access the secured network;
  determining that the host operating system is not operating;
  determining whether a second network connection different from the secured network upon is available;
  obtaining the authentication credentials from a credential server via the second network upon determining that the second network is available;
  obtaining the authentication credentials from the credential server via an out-of-band link upon determining that the second network is not available; and
  the management engine connecting to the secured network using the obtained authentication credentials and communicate over the secured network from the management engine independently of the host operating system.

16. The article as claimed in claim 15, wherein the connecting to the secured network comprises connecting via a hotspot connection.

17. The article as claimed in claim 16, wherein the hotspot connection is selected from the group consisting of: local area network and wireless local area network.

18. The article as claimed in claim 15, wherein the connecting to the secure network includes using secure protocols.

19. The article as claimed in claim 15, wherein detecting the connection to the secured network further comprises determining that the management engine does not have a copy of the authentication credentials.

20. The article as claimed in claim 15, further comprising the management engine storing a copy of the authentication credentials for subsequent access to the secured network.

21. The article as claimed in claim 15, wherein the management engine comprises an embedded management environment.

\* \* \* \* \*